United States Patent [19]

Kamiura et al.

[11] Patent Number: 4,605,527
[45] Date of Patent: Aug. 12, 1986

[54] PROCESS FOR PRODUCING CLUTCH FACINGS

[75] Inventors: Hirofumi Kamiura; Takashi Natori, both of Osaka, Japan

[73] Assignee: Nippon Valqua Kogyo Kabushiki Kaisha, Tokyo, Japan

[21] Appl. No.: 595,381

[22] Filed: Mar. 30, 1984

[30] Foreign Application Priority Data

Sep. 24, 1983 [JP] Japan .................. 58-176689

[51] Int. Cl.4 .......................................... B29B 11/16
[52] U.S. Cl. ................... 264/137; 264/145; 264/160; 264/171; 264/175; 264/236; 264/326; 264/347
[58] Field of Search .............. 264/171, 175, 135, 136, 264/137, 211, 236, 271.1, 279.1, 349, 160, 145, 347, 32 C

[56] References Cited

U.S. PATENT DOCUMENTS

| | | | |
|---|---|---|---|
| 3,301,932 | 1/1967 | Chisholm | 264/279.1 |
| 3,334,163 | 8/1967 | Gilbert | 264/236 |
| 3,582,420 | 6/1971 | Marzocchi et al. | 264/136 |
| 3,645,958 | 2/1972 | Palumbo | 264/211 |
| 3,756,910 | 9/1973 | Peters et al. | 156/166 |
| 3,965,055 | 6/1976 | Shichman et al. | 264/236 |
| 3,993,726 | 11/1976 | Moyer | 264/280 |
| 4,015,039 | 3/1977 | Segal et al. | 264/136 |
| 4,130,537 | 12/1978 | Bohrer | 428/273 |
| 4,156,752 | 5/1979 | Riccitiello et al. | 264/236 |
| 4,202,850 | 5/1980 | Yamamoto et al. | 264/236 |
| 4,389,361 | 6/1983 | Messerly | 264/236 |

FOREIGN PATENT DOCUMENTS 57-3828 1/1982 Japan .

Primary Examiner—Jeffery Thurlow
Attorney, Agent, or Firm—Wenderoth, Lind & Ponack

[57] ABSTRACT

A process for producing a clutch facing which comprises the steps of: impregnating inorganic fibers with a thermosetting resin; causing rubber composition sheets to adhere to the resin-impregnated inorganic fibers, said sheets having been obtained by causing organic fibers to add to a rubber composition as a processing aid and forming the resulting material into sheets; forming a preform therefrom; and molding the preform under heat and pressure.

9 Claims, 6 Drawing Figures (a)

PROCESS FOR PRODUCING CLUTCH FACINGS

BACKGROUND OF THE INVENTION

This invention relates to a process for producing clutch facings, and more particularly to a process for producing a clutch facing which can exhibit good performance without the use therein of any asbestos.

Hitherto, a clutch facing has been produced by dissolving a thermosetting resin such as phenolic resin, a rubber material, a vulcanizing agent, a vulcanization accelerator, a friction improver, a filler and the like in a solvent, causing this solution to adhere to an asbestos substrate, then preforming the structure thus obtained and thereafter molding the preformed structure or preform in a mold under heat and pressure. Recently, however, evidence has been found indicating that asbestos may be harmful (i.e., carcinogenic) to humans. Accordingly, asbestos-free clutch facings have become of interest in recent years.

Asbestos-free clutch facings are produced in each case by bonding a thermosetting resin such as phenolic resin, a rubber material, a vulcanizing agent, a vulcanization accelerator and the like to glass fibers as a substrate, then preforming the resulting structure, and molding the preformed structure or preform in a mold under heat and pressure. Such a process has been proposed in, for example, U.S. Pat. No. 4,130,537. Because the clutch facings comprising glass fibers as a substrate exhibit aggressive behavior during operation, according to the process taught in U.S. Pat. No. 4,130,537, organic fibers such as rayon, hemp and cotton are previously incorporated into glass fibers in an amount of from 10 to 185% by weight based on the weight of the glass fibers, and the resulting composite yarns are dipped in a solvent in which phenolic resin, rubber compositions, other friction improvers and the like have been dissolved or dispersed, to cause these materials to adhere onto the composite yarns. Then a preformed structure is produced and thereafter is subjected to heat and pressure to produce a clutch facing.

According to this process, however, the solvent is used in causing phenolic resins, rubber compositions, other friction improvers and the like to adhere to the composite yarns of the glass fibers and the organic fibers. Moreover, various materials having different specific gravities are contained in the rubber composition. For this reason, the materials having large specific gravities which are contained in the rubber composition sink to the bottom of the solvent, and therefore it is difficult to cause a rubber compound having a uniform composition to adhere onto the composite yarns. Further, it is difficult to control the amount of the materials adhering to the composite yarns.

Thus, there arises a problem in that deviant scattering of the characteristics of the resulting clutch facings tends to occur. Furthermore, since a solvent is used in the adhesion step described above, the solvent may remain in the interior of the clutch facings although the solvent is readily dissipated from the surface during drying and molding. This solvent cannot be completely removed under heat and pressure, and therefore it gradually gasifies during use of the clutch facings by virtue of frictional heat to appear at the surface. Thus, the coefficient of friction is reduced and gives rise to the problem of fading phenomenon.

Japanese Patent Laid-Open Pub. No. 3828/1982 of the present applicant discloses a process for producing a clutch facing which comprises impregnating glass fibers or a composite of glass fibers and asbestos with a solution of thermosetting resins such as phenolic resin, drying the impregnated structure, causing a bulk rubber composition to adhere to the resulting substrate by forming in situ the bulk rubber composition into a sheet by means of rolls, then preforming the resulting structure and thereafter subjecting it to heat and pressure.

However, according to this method, the rubber composition is caused to adhere onto the substrate by forming in situ the bulk rubber composition into a sheet by means of rolls, and therefore it is difficult to obtain a rubber composition having a uniform film thickness. Furthermore, the rubber composition may adhere to the rolls, and the resulting sheetlike rubber composition may be cut on the way. Accordingly, the rubber composition cannot be caused to adhere uniformly onto the glass fiber substrate, and deviant scattering of the characteristics of the resulting clutch facings occurs.

We have carried out further studies in view of these problems and as a result have made the following findings.

(a) U.S. Pat. No. 4,130,537 teaches that organic fibers such as rayon, hemp and cotton must be used in an amount of from 10% to 185% by weight based on the weight of the glass fibers along with the glass fibers because clutch facings comprising a glass fiber substrate exhibit aggressive behavior during operation. However, according to the results of our studies, clutch facings comprising glass fibers do not exhibit aggressive behavior during operation, and in this regard, it is not necessary at all to use organic fibers. When a large amount of an organic fiber is used, the organic fibers are melted or carbonized by frictional heat generated during use of the clutch facing. Thus, the coefficient of friction of the clutch facing is reduced, and the use of a large amount of organic fibers is not desirable.

(b) When the rubber composition preformed into a sheet is used to cause the rubber composition to adhere to the glass fiber substrate, the prior art problems associated with the use of a solvent are solved all at once.

(c) As mentioned above, a uniform rubber composition cannot be caused to adhere to the substrate in the process of causing the bulk rubber composition to adhere to the substrate. This problem is solved by mixing a small amount of organic fibers into the rubber composition and forming it beforehand into a sheet.

SUMMARY OF THE INVENTION

It is an object of the present invention to provide a process for producing clutch facings exhibiting good performances without the use therein of any asbestos.

It is another object of the present invention to provide a process for producing clutch facings wherein a large amount of a solvent is not used in the production steps.

It is a further object of the present invention to provide a process for producing clutch facings wherein a rubber composition can be caused to adhere uniformly to a substrate of glass fibers and the like, and wherein little or no deviant scattering of characteristics occurs.

It is a still further object of the present invention to provide a process for producing clutch facings wherein no cutting or tearing occurs in the step of forming the rubber composition into a sheet, and wherein the workability of the clutch facings is excellent.

A process for producing a clutch facing according to the present invention comprises causing a thermosetting resin such as phenolic resin, and a rubber composition containing a rubber material, a vulcanizing agent, a vulcanization accelerator and a friction improver to adhere to inorganic fibers such as glass fibers, then preforming it and thereafter molding the preform under heat and pressure. The process of the present invention is characterized by adding organic fibers to the rubber composition as a processing aid, forming the rubber composition into a sheet and causing the sheet to adhere to the inorganic fibers.

The nature, utility, and further features of this invention will be more clearly apparent from the following detailed description with respect to a preferred embodiment of the invention when read in conjunction with the accompanying drawings briefly described below.

DETAILED DESCRIPTION OF THE INVENTION

Figure 1:
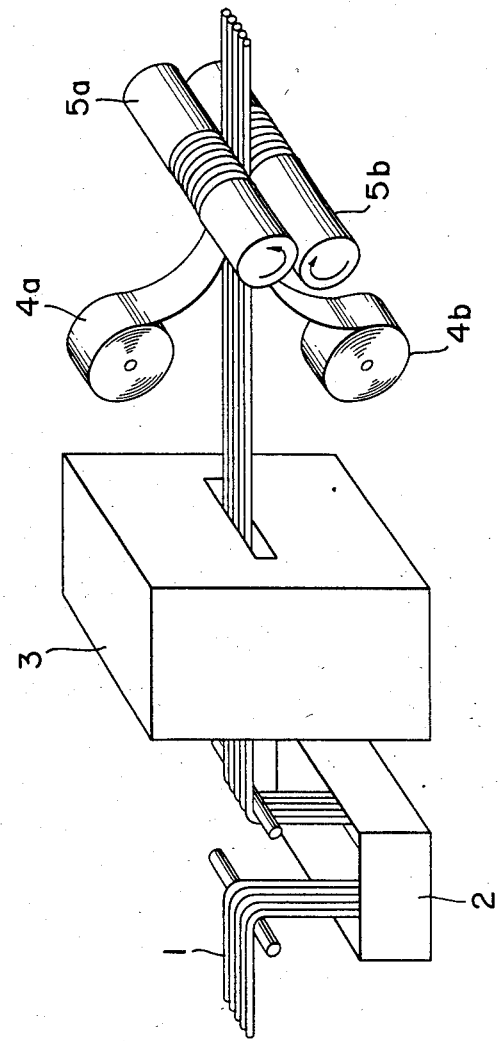
FIG. 1 is a schematic perspective view illustrating steps of producing clutch facings according to the present invention.

FIG. 1 is a schematic perspective view illustrating the steps for continuously producing a clutch facing stock material according to the present invention. A plurality of yarns 1, each comprising a plurality (of the order of from 30 to 100) of inorganic fibers, are caused to travel in parallel state in their longitudinal direction and are introduced into a vessel 2 containing a solution of a thermosetting resin to cause the resin to adhere to the yarns 1. Thereafter, the yarns 1 thus coated are amply dried in a dryer 3. Then sheets 4a and 4b of a rubber composition unwound from respective rolls are brought into contact with the upper and lower sides of the yarns 1, thus sandwiching the yarns therebetween, and are squeezed between and by a pair of rolls 5a and 5b. The sheets 4a and 4b are thus squeezed with the yarns 1 interposed therebetween to form an integral sheet 4 of the rubber composition adhering to the yarns 1.

Figure 2:
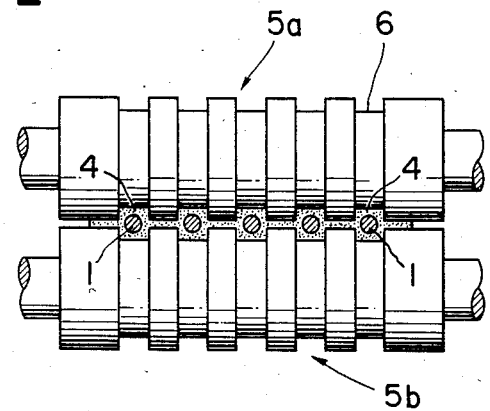
FIG. 2(a) is a view in the direction of work flow showing a pair of rolls used for causing a rubber composition to adhere to inorganic fibers in the form of strands of yarn, which are shown in cross section.
FIGS. 2(b)-(d) are views similar to FIG. 2(a) respectively illustrating other examples of shapes of concave grooves formed on pairs of rolls, which are shown in longitudinal section.
Figure 2:
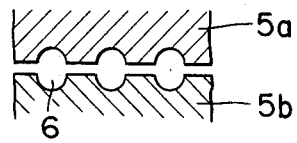
Figure 2:
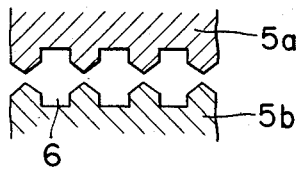
Figure 2:
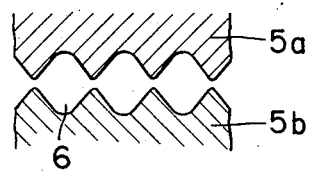

As shown in FIG. 2(a), the cylindrical peripheries of the pair of rolls 5a and 5b are provided with annular grooves 6 respectively alined with each other and with respective yarns 1. When the yarns 1 and the rubber composition sheets 4a and 4b are fed into the space between the pair of rolls 5a and 5b, the yarns 1 are introduced into respective aligned grooves 6 on the roll peripheries, while the rubber composition sheets 4a and 4b are placed into contact with the upper and lower bottom surfaces of the yarns 1 to completely surround the yarns 1 as a coating. In addition to rolls 5a and 5b with the grooves shown in FIG. 2(a), rolls having grooves as shown in FIGS. 2(b), 2(c), and 2(d) may be used.

Figure 3:
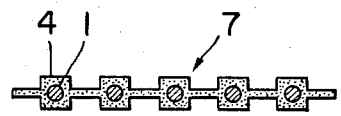
FIG. 3 is a cross-sectional view of an example of a clutch facing stock material obtained by using the rolls shown in FIG. 2(a).

As a result of the above described operation, a clutch facing stock material of a cross section as shown in FIG. 3 wherein the yarns 1 are coated with and surrounded by the rubber composition 4 and adjacent yarns 1 are connected by portions of the rubber composition 4, is obtained.

In the above described operation of feeding the yarns 1 and the rubber composition sheets 4a and 4b between the pair of rolls 5a and 5b, application of an excessive pressing force between the rubber composition sheets and the rolls is prevented by adjusting the distance between the pair of rolls 5a and 5b according to the thickness of the rubber composition sheets or by using rolls having a different groove depth, whereby the rubber composition are readily released from the rolls. When a releasing agent (talc or the like) is previously applied to (or distributed over) surfaces of the rubber composition to contact the rolls, release of the rubber composition from the rolls is facilitated.

The clutch facing stock material is then so cut that the yarns 1 are divided into groups each having 1 to 5 yarns. These are wound about the central axis portion of a mold for preforming in a winding manner (such as random, spiral or bias) to preform the material into an annular structure having the required size. Each preformed structure is placed in a molding mold and cured under heat and pressure to obtain the desired clutch facing.

While glass, carbon, ceramics, metal, basalt, calcium silicate and serpentine fibers and the like may be used as the inorganic fibers, glass fibers are particularly preferred. These inorganic fibers may be used in the form of yarn, roving, felt, ribbon, tape and the like.

Examples of the thermosetting resins are phenolic resins, urea resins, melamine resins, and epoxy resins. Among these resins, phenolic resins are preferred. Phenolic resins of novolac-type, resole-type, aqueous solution-type, alcoholic solution-type can be used.

The rubber composition contains a rubber material, a vulcanizing agent, a vulcanization accelerator and a friction improver. The rubber materials which can be used in the present invention are synthetic rubbers such as butadiene rubber (BR), styrene-butadiene rubber (SBR), isoprene rubber (IR), ethylenepropylene rubber (EPM), isoprene-isobutylen rubber (IIR), chloroprene rubber (CR), acrylonitrile-butadiene rubber (NBR), chlorosulfonated polyethylene (CSM), acrylic rubber (ACM), urethane rubber (U), silicone rubber (Si), fluororubber (FPM), polysulfide rubber (T) and polyether rubber (POR) as well as natural rubbers. Styrene-butadiene rubber (SBR) and acrylonitrile-butadiene rubber (NBR) are particularly preferred.

Sulfur, zinc oxide, magnesium oxide, peroxides, dinitrosobenzene and the like can be used as the vulcanizing agent. Thiazole accelerators, polyamine accelerators, sulfonamide accelerators, dithiocarbamate accelerators, aldehydeamine accelerators, guanidine accelerators, thiourea accelerators, xanthate accelerators and the like can be used as the vulcanization accelerator.

Clay, talc, barium sulfate, cashew dust, graphite, lead sulfate, rottenstone (siliceous limestone) and the like can be used as the friction improver.

Organic fibers are added to these rubber compositions as a processing aid. Organic fibers having excellent heat resistance and softness are preferred. Exemplary organic fibers which can be used in the present invention are natural fibers such as hemp, cotton, wool and silk and synthetic fibers such as rayon, acetate, acetated staple fibers, polyamide fibers such as nylon, polyvinyl alcohol fibers such as vinylon, polyacrylic fibers, polystyrene fibers, phenolic resin fibers and aramid fibers.

The organic fibers added to the rubber composition have a fiber diameter of from 5 to 60 μm, preferably from 10 to 40 μm, a length of from 1 to 50 mm, preferably from 3 to 10 mm and an aspect ratio (length per diameter) of from 200 to 5,000, preferably from 200 to 1,000. The use of such organic fibers is desirable from the standpoint of enhanced processability of the rubber composition. If the length of the organic fibers is too long, the dispersibility of the organic fibers in the rubber composition becomes inferior, and therefore the use of such longer fibers is undesirable.

Throughout the following description, quantities expressed in percent are by weight unless otherwise specified.

The organic fibers are added to the rubber composition in an amount of from 1% to 15%, preferably from 1% to 9%, and more preferably from 1% to 5% based on the weight of the rubber composition. If the amount of the organic fibers added is more than 15%, the organic fibers will melt or be carbonized by frictional heat generated in the use of the clutch facing, whereby the coefficient of friction of the clutch facing will be reduced. Therefore the use of more than 15% of the organic fibers is not desirable. If the amount of the organic fibers added is less than 1%, the processability of the rubber composition will not be appreciably improved, and therefore the use of less than 1% of the organic fibers is undesirable.

The processability of the rubber composition is significantly improved by adding organic fibers to the rubber composition. That is to say, when a bulk rubber composition to which the organic fibers have been added is passed through pressure rolls to form a rubber composition sheet, it can be readily formed with a uniform thickness without the occurrence of tearing or like damage. Further, when this rubber composition sheet is fed between rolls to cause it to adhere the inorganc fibers, tearing of the rubber composition sheet does not occur, and therefore the workability is significantly improved. Moreover, it is possible to cause the rubber composition to adhere uniformly to the inorganic fibers. Thus, clutch facings exhibiting little or no deviant scattering of characteristics can be obtained.

If glass fibers, ceramic fibers or carbon fibers are added to the rubber composition in place of the organic fibers, tearing of the fibers will occur during rubber-kneading, and tearing of the rubber composition sheet occurs when the rubber composition is being formed into a sheet, no improvement of the processability is observed.

The term "sheet" as used herein refers to a thin planar film-like structure having an approximately uniform film thickness and is intended to mean and include broadly the terms tape, film, strip, and the like.

The nature and utility of the present invention will now be indicated more fully by a number of examples thereof, it being understood that the scope of the present invention is not limited thereby.

EXAMPLE 1

A glass roving was used as inorganic fibers and dipped in a vessel containing a solution of modified phenolic resin to impregnate the glass therewith and to cause the modified phenolic resin to adhere to the glass roving. The glass roving thus impregnated and coated with the modified phenolic resin was then dried at a temperature of from 90° to 120° C. and thereafter arranged in an array of a number of tens of rovings. The glass rovings were introduced into grooves of a pair of grooved rolls together with a rubber composition (I) having the following composition which had been formed into sheets having a width of 300 mm and a thickness of 0.2 mm and which were unwound from rolls and fed into the space between the grooved rolls described above so as to sandwich the roving interposed therebetween. The rubber composition sheets were thereby caused to adhere to the roving to produce a stock material for clutch facings.

| Rubber composition (I) | |
|---|---|
| NBR rubber | 50% by weight |
| ZnO | 2% |
| Cashew dust | 5% |
| Barium sulfate | 15% |
| Clay | 9% |
| Talc | 9% |
| Sulfur | 8% |
| Phenolic resin fibers | 2% |

The stock material for clutch facings thus obtained was then divided into parts having from 1 to 3 yarns, which were wound about a central portion of a mold for preforming in a bias state. The material was thus preformed into annular structures of the required size, and each preformed structure was transferred to a mold for molding, wherein it was subjected to heat and pressure for 5 minutes at a temperature of 160° C. and under a pressure of 200 kgf/cm², thereby to vulcanize and cure the rubber composition and phenolic resin. Each structure was further subjected to a heat treatment for 5 hours at a temperature of 170° C. to produce an annular clutch facing.

The resulting clutch facing contained 50% of glass fibers, 10% of phenolic resin (thermosetting resin) and 40% of the rubber composition.

In the meanwhile, the rubber composition (I) was prepared by blending the component described above by means of rolls, then extruding the same into a sheet while the thickness was adjusted to 0.2 mm by means of calender rolls, cutting this sheet with a cutter to a width of 300 mm and thereafter winding the sheet into a roll. The rubber composition sheets thus obtained were used in the process described above. The green strength (tensile strength, yield value) of the rubber composition (I) was 6.2 kgf/cm².

Characteristics of the thus obtained clutch facing were measured and the results obtained are shown in Table.

EXAMPLE 2

A clutch facing was produced by the process described in Example 1 except that a rubber composition (II) having the following composition was used. Its characteristics were measured, and the results obtained were as shown in the Table.

| Rubber composition (II) | |
|---|---|
| NBR rubber | 50% |
| ZnO | 2% |
| Cashew dust | 5% |
| Barium sulfate | 15% |
| Clay | 8% |

-continued

| Rubber composition (II) | |
|---|---|
| Talc | 7% |
| Sulfur | 8% |
| Phenolic resin fibers | 5% |

The green strength (tensile strength, yield value) of this rubber composition (II) was 14.3 kgf/cm$^2$.

EXAMPLE 3

A clutch facing was produced by the procedure described in Example 1 except that a rubber composition (III) having the following composition was used. Its characteristics were measured, and the results obtained were as shown in Table.

| Rubber composition (III) | |
|---|---|
| NBR rubber | 50% |
| ZnO | 2% |
| Cashew dust | 5% |
| Barium sulfate | 15% |
| Clay | 6% |
| Talc | 5% |
| Sulfur | 8% |
| Phenolic resin fibers | 9% |

The green strength (tensile strength, yield value) of this rubber composition (III) was 21.5 kgf/cm$^2$.

TABLE

| | | Clutch facing of Example 1 | Clutch facing of Example 2 | Clutch facing of Example 3 |
|---|---|---|---|---|
| Bending stress*$^1$ (kgf/mm$^2$) | Radial direction | 14.4–18.5 | 16.3–19.6 | 17.4–21.9 |
| | Circumferential direction | 4.0–4.9 | 4.5–5.1 | 4.8–5.5 |
| Maximum strain*$^2$ ($\times 10^{-3}$ mm/mm) | Radial direction | 22.3–25.1 | 24.6–29.7 | 25.4–31.8 |
| | Circumferential direction | 11.4–13.6 | 12.5–15.2 | 15.1–19.3 |
| Coefficient of *$^3$ friction (average) | 200° C. | 0.45 | 0.44 | 0.45 |
| | 300° C. | 0.45 | 0.45 | 0.43 |
| Abrasion amount*$^4$ (mm) | 200° C. | 0.38 | 0.37 | 0.37 |
| | 300° C. | 0.76 | 0.77 | 0.80 |

Notes:
*$^1$Bending stress was measured according to JIS D 4311.
*$^2$Maximum strain was measured according to JIS D 4311.
*$^3$Coefficient of friction was measured by an inertia full-size tester.
*$^4$Abrasion amount was measured by an inertia full-size tester.

Test sample size: 200 diam. × 130 diam. × t 3.5.
Moment of inertia: 0.12 kgf·m·sec$^2$.
Test cycles: 10,000 times.
The abrasion amount is that on the front and back sides.

In the process for producing clutch facings according to the present invention, organic fibers are added as a processing aid to a rubber composition to be caused to adhere to inorganic fibers, and the resulting structure is formed into a sheet. Therefore, the following effects are obtained.

(a) Even if no asbestos is used, good clutch facings are obtained.

(b) It is unnecessary to use a large amount of a solvent in the production steps, and therefore gasification of the solvent contained in the interior does not occur during use of the resulting clutch facing. Moreover reduction of the coefficient of friction does not occur.

(c) Since the organic fibers are incorporated into the rubber composition, no tearing occurs in the step of forming the rubber composition into a sheet.

(d) Since the rubber composition can be formed into a sheet, it is possible to cause the rubber composition to adhere uniformly to the inorganic fibers. Accordingly, workability is significantly improved, and little or no deviant scattering of characteristics of the resulting clutch facing occurs.

What is claimed is:

1. In a process for producing a clutch facing which comprises first causing a thermosetting resin and then a rubber composition to adhere to inorganic fibers, forming a preform therefrom and molding said preform under heat and pressure, the improvement which comprises adding organic fibers to said rubber composition as a processing aid in an amount of from 1 to 15% by weight, based on the weight of the rubber composition, forming said rubber composition containing said organic fibers into a sheet and causing said sheet to adhere to said inorganic fibers without using a hydrocarbon solvent.

2. The process according to claim 1 wherein the inorganic fibers are selected from the group consisting of glass, carbon, ceramics, metal, basalt, calcium silicate and serpentine fibers.

3. The process according to claim 1 wherein the thermosetting resin is phenolic resin.

4. The process according to claim 1 wherein the rubber composition contains a rubber material, a vulcanizing agent, a vulcanization accelerator and a friction improver.

5. The process according to claim 1 wherein the organic fibers have a fiber diameter of from 5 to 60 μm, a length of from 1 to 50 mm and an aspect ratio of from 200 to 5,000.

6. The process according to claim 1 wherein the organic fibers are selected from the group consisting of hemp, cotton, wool, pulp, silk, rayon, acetate, acetated staple fibers, polyamide fibers, polyvinyl alcohol fibers, polyacrylic fibers, polystyrene fibers, phenolic resin fibers and aramid fibers.

7. The process according to claim 1 wherein the amount of the organic fibers added to the rubber composition is from 1 to 9% by weight based on the weight of the rubber composition.

8. The process according to claim 1 wherein a pair of rolls having concave grooves on their periphery are used in causing the rubber composition to adhere to the inorganic fibers.

9. A process according to claim 1 wherein the amount of the organic fibers added to the rubber composition is from 1 to 5%, based on the weight of the rubber composition.

* * * * *